United States Patent
Moberg et al.

(10) Patent No.: US 10,220,808 B2
(45) Date of Patent: Mar. 5, 2019

(54) SYSTEMS, APPARATUSES, AND METHODS OF A BUTTON BRIDGE INSTALLED WITH A CURTAIN SIDE AIRBAG

(71) Applicant: TOYOTA MOTOR ENGINEERING & MANUFACTURING NORTH AMERICA, INC., Erlanger, KY (US)

(72) Inventors: Joshua L. Moberg, Milan, MI (US); John J. Lavoie-Mayer, Ann Arbor, MI (US); John A. Scheick, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 88 days.

(21) Appl. No.: 15/332,517

(22) Filed: Oct. 24, 2016

(65) Prior Publication Data

US 2018/0111582 A1    Apr. 26, 2018

(51) Int. Cl.

| | |
|---|---|
| *B60R 21/2334* | (2011.01) |
| *B60R 21/232* | (2011.01) |
| *B60R 21/237* | (2006.01) |
| *B60R 21/231* | (2011.01) |
| *B60R 21/233* | (2006.01) |
| B60R 21/2338 | (2011.01) |

(52) U.S. Cl.
CPC ........ *B60R 21/2334* (2013.01); *B60R 21/232* (2013.01); *B60R 21/233* (2013.01); *B60R 21/237* (2013.01); *B60R 21/23138* (2013.01); *B60R 2021/23308* (2013.01); *B60R 2021/23386* (2013.01)

(58) Field of Classification Search
CPC .......... B60R 21/2334; B60R 21/23138; B60R 21/232; B60R 21/237
See application file for complete search history.

(56) References Cited

U.S. PATENT DOCUMENTS

| | | | |
|---|---|---|---|
| 5,730,464 A | 3/1998 | Hill | |
| 7,040,653 B1 | 5/2006 | Breed | |
| 7,549,672 B2 | 6/2009 | Sato et al. | |
| 7,828,322 B2 | 11/2010 | Breuninger et al. | |
| 7,942,444 B2 * | 5/2011 | Steinbach | B60R 21/232 280/730.2 |
| 8,430,422 B2 * | 4/2013 | Wehner | B60R 21/231 280/730.1 |
| 8,480,125 B1 * | 7/2013 | Belwafa | B60R 21/21 280/730.2 |
| 8,596,673 B2 * | 12/2013 | Ruedisueli | B60R 21/21 280/730.2 |
| 8,727,375 B2 * | 5/2014 | Suzuki | B60R 21/233 280/730.2 |

(Continued)

*Primary Examiner* — Darlene P Condra
(74) *Attorney, Agent, or Firm* — Oblon, McClelland, Maier & Neustadt, L.L.P.

(57) ABSTRACT

A button bridge system can include a curtain side airbag and a button bridge attached to the curtain side airbag. The button bridge can be attached to the curtain side airbag at various portions of the curtain side airbag such that a lower portion of curtain side airbag can be folded to a predetermined fold length. The lower portion of curtain side airbag and a corresponding portion of the button bridge can be stored in a storage position such that the button bridge is pulled taut when the curtain side airbag is deployed.

20 Claims, 5 Drawing Sheets

(56) References Cited

U.S. PATENT DOCUMENTS

| | | | |
|---|---|---|---|
| 9,016,718 B2 * | 4/2015 | Fukawatase | B60R 21/233 280/730.2 |
| 9,227,590 B2 * | 1/2016 | Fujiwara | B60R 21/23138 |
| 9,296,350 B2 * | 3/2016 | Hirakawa | G01S 7/521 |
| 10,023,148 B2 * | 7/2018 | Choi | B60R 21/16 |
| 2010/0032930 A1 * | 2/2010 | Yamamura | B60R 21/232 280/730.2 |
| 2011/0272928 A1 * | 11/2011 | Czach | B60R 21/232 280/730.2 |
| 2015/0115581 A1 | 4/2015 | Mazanek et al. | |
| 2015/0375710 A1 | 12/2015 | Sievers et al. | |
| 2016/0200278 A1 | 7/2016 | Wiik et al. | |

\* cited by examiner

SYSTEMS, APPARATUSES, AND METHODS OF A BUTTON BRIDGE INSTALLED WITH A CURTAIN SIDE AIRBAG

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Curtain side airbags (CSA) can utilize "buttons" within the curtain to provide a desired airflow, volume, and deployment characteristics of the CSA. The buttons can be portions of the curtain stitched together such that air does not flow in where the curtain is stitched. The buttons can cause an uneven surface of the curtain when the curtain is inflated.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to aspects of the disclosed subject matter, a button bridge system can include a curtain side airbag and a button bridge attached to the curtain side airbag. The attachment of the button bridge to the curtain side airbag can include a first bridge sew attaching the button bridge to the curtain side airbag at a first predetermined portion of the curtain side airbag such that the curtain side airbag can be folded in a first direction such that the first bridge sew is a predetermined distance from a fold line, a second bridge sew attaching the button bridge to a second predetermined portion of the curtain side airbag, and a storage position such that the first bridge sew is rolled a predetermined amount in a second direction, the second direction being opposite the first direction.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
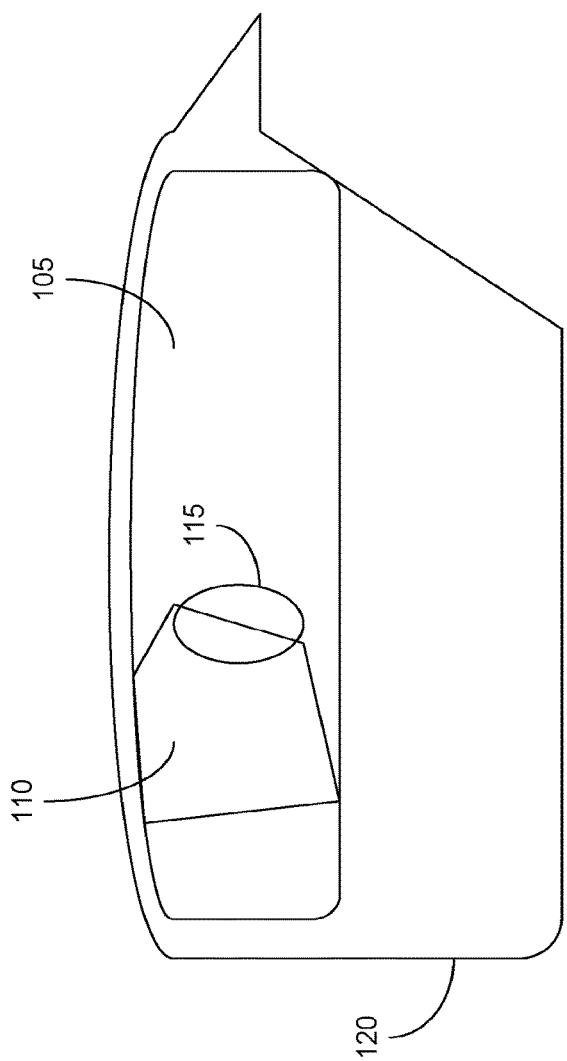
FIG. 1 is an exemplary overview of a button bridge system according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment", "an embodiment", "one aspect", or "an aspect" means that a particular feature, structure, characteristic, operation, or function described in connection with an embodiment or aspect is included in at least one embodiment or aspect of the disclosed subject matter. Thus, any appearance of the phrases "in one embodiment" or "in an embodiment" in the specification is not necessarily referring to the same embodiment or aspect. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "front," "rear," "height," "length," "upper," "lower," "forward," "rearward," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

FIG. 1 is an exemplary overview of a button bridge system 100 (herein referred to as system 100) according to one or more aspects of the disclosed subject matter. The system 100 can include a curtain side airbag (CSA) 105 installed in a vehicle 120. The CSA 105 represents a curtain side airbag that can be distributed throughout the vehicle 120 as would be known to one of ordinary skill in the art. Additionally, the CSA 105 can include one or more buttons as would be known by one of ordinary skill in the art. The buttons can be portions of the CSA 105 stitched together such that air does not flow where the CSA 105 has a button. More specifically, the CSA 105 can utilize the one or more buttons to provide a desired airflow, volume, and deployment characteristics of the CSA 105.

A button bridge 110 can be attached to the CSA 105. The button bridge 110 can be a flexible material (e.g., the same material as the CSA 105) that can be held taut to provide a more uniform surface of the CSA 105 when the CSA 105 is deployed. The more uniform surface of the CSA 105 provided by the button bridge 110 when the CSA 105 is deployed can prevent an uneven surface of the CSA 105 caused by the one or more buttons of the CSA 105. The button bridge 110 can provide a bridge to extend across the one or more buttons of the CSA 105, thereby reducing and/or preventing the unevenness in the CSA 105 caused by the one or more buttons. The button bridge 110 can be positioned on a portion of the curtain side airbag 105 such that the button bridge 110 can potentially be in contact with an occupant 115 of the vehicle 120 when the CSA 105 is deployed. In other words, the button bridge 110 can be positioned on a portion of the curtain side airbag 105 that is designed to deploy toward the occupant 115 of the vehicle 120 such that the button bridge 110 can contact the occupant 115 when the CSA 105 is in a deployed position.

The button bridge 110 can be attached (e.g., stitching) to an upper and lower portion of the CSA 105. In another aspect, the button bridge 110 can be attached to the CSA 105 at the upper portion of the CSA 105, the lower portion of the CSA 105, a forward portion of the CSA 105, and a rearward portion of the CSA 105. The button bridge 110 can be attached such that when the CSA 105 inflates, the button bridge 110 is pulled taut as further described herein.

Figure 2B:
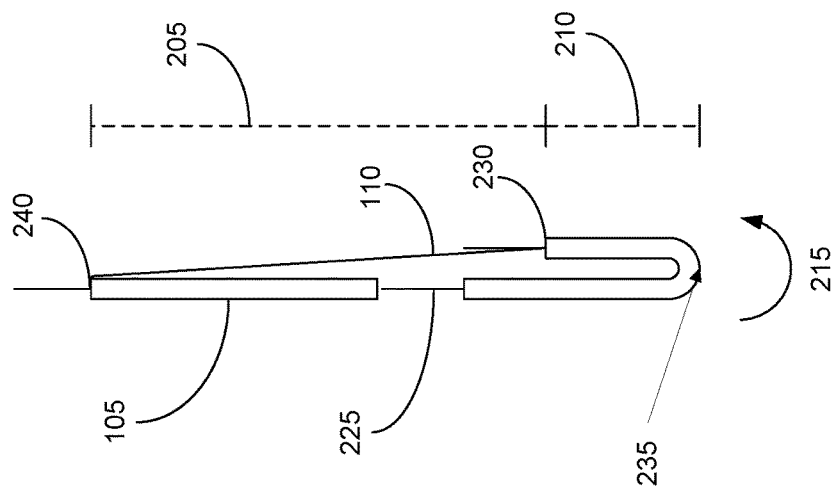
FIG. 2B is a side view of the curtain side airbag with a button bridge attached according to one or more aspects of the disclosed subject matter.
Figure 2A:
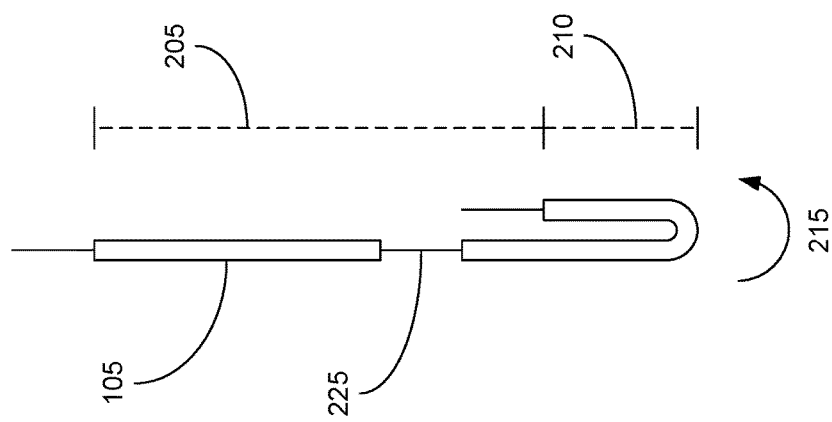
FIG. 2A is a side view of a curtain side airbag with a predetermined fold in a lower portion of the curtain side airbag according to one or more aspects of the disclosed subject matter.

FIG. 2A is a side view of the CSA 105 with a predetermined fold in a lower portion of the CSA 105 according to one or more aspects of the disclosed subject matter. The fold direction 215 of the predetermined fold is folded toward the direction of the occupant 115 of the vehicle 120. A fold length 210 can correspond to the distance from a fold line 235 (the point at which the CSA 105 is folded in fold direction 215) and a lower portion of the CSA 105 to which the button bridge 110 can be attached. CSA length 205 can be the fold length 210 subtracted from the distance from the top of the CSA 105 to the fold line 235. Therefore, any variation in the fold length 210 will cause a corresponding variation in the CSA length 205. Additionally, a button 225 can prevent airflow to a predetermined portion of the CSA 105, for example.

The button bridge 110 can be attached such that a predetermined fold length 210 can correspond to a predetermined tautness of the button bridge 110 when the CSA 105 is deployed. The tautness of the button bridge 110 is what can allow the occupant 115 to maintain an appropriate head positioning when the CSA 105 is deployed, rather than the head of the occupant 115 turning due unevenness from the button 225 in the CSA 105. For example, each make and model of a vehicle (and the year of the vehicle if the make and model of the vehicle had more than one year of production) can have a known fold length 210 that optimizes the tautness of the button bridge 110 when the CSA 105 is deployed, thereby maximizing safety. The fold length 210 that corresponds to a specific year, make, and model of a vehicle can be calculated and stored (e.g., as a table) in a remote device such as a laptop, computer, tablet, smart phone, PDA, and the like, for example. Having a simple measurement such as the fold length 210 can allow for a repeatable method for mass production of vehicles.

Other factors that may influence the tautness of the button bridge 110 may include inflator pressure/size, inflation time, curtain chamber size, and the like. However, because these are known factors, the predetermined fold length 210 can be selected to include the additional factors that may influence the tautness of the button bridge 110 and account for those factors when selecting the fold length 210. In other words, the table of predetermined fold lengths 210 for each vehicle can include the calculated effect of the additional tautness influencers when selecting the predetermined fold length 210 for each vehicle.

FIG. 2B is a side view of the CSA 105 with the button bridge 110 attached according to one or more aspects of the disclosed subject matter. The button bridge 110 can be attached to the lower portion of the CSA 105 at a first bridge sew 230 and an upper portion of the CSA 105 at a second bridge sew 240. The button bridge 110 can provide a bridge over the button 225. Additionally, the button bridge 110 can assist in maintaining the fold direction 215 of the fold in the lower portion of the CSA 105.

Figure 2C:
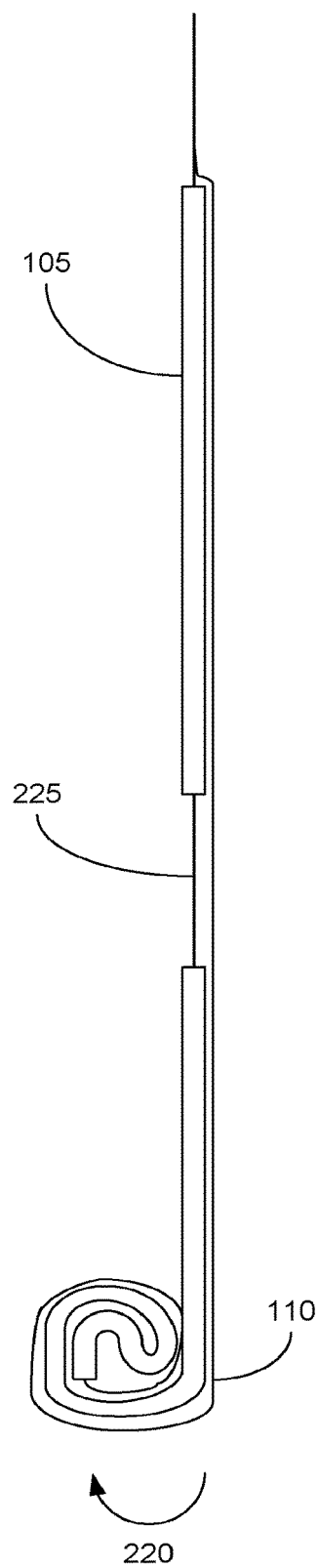
FIG. 2C is a side view of the curtain side airbag and button bridge in a storage position according to one or more aspects of the disclosed subject matter.

FIG. 2C is a side view of the CSA 105 and the button bridge 110 in a storage position according to one or more aspects of the disclosed subject matter. The lower portion of the CSA 105 and the corresponding section of the button bridge 110 can be rolled in a roll direction 220. As a result of being rolled a predetermined amount in the roll direction 220, the CSA 105 and the button bridge 110 can reach a storage position. The roll direction 220 can be opposite in direction relative the fold direction 215. In the storage position, the button bridge 110 can maintain the bridge over the button 225. The storage position can be the position in which the CSA 105 and button bridge 110 can be stored for a future deployment.

Figure 3:
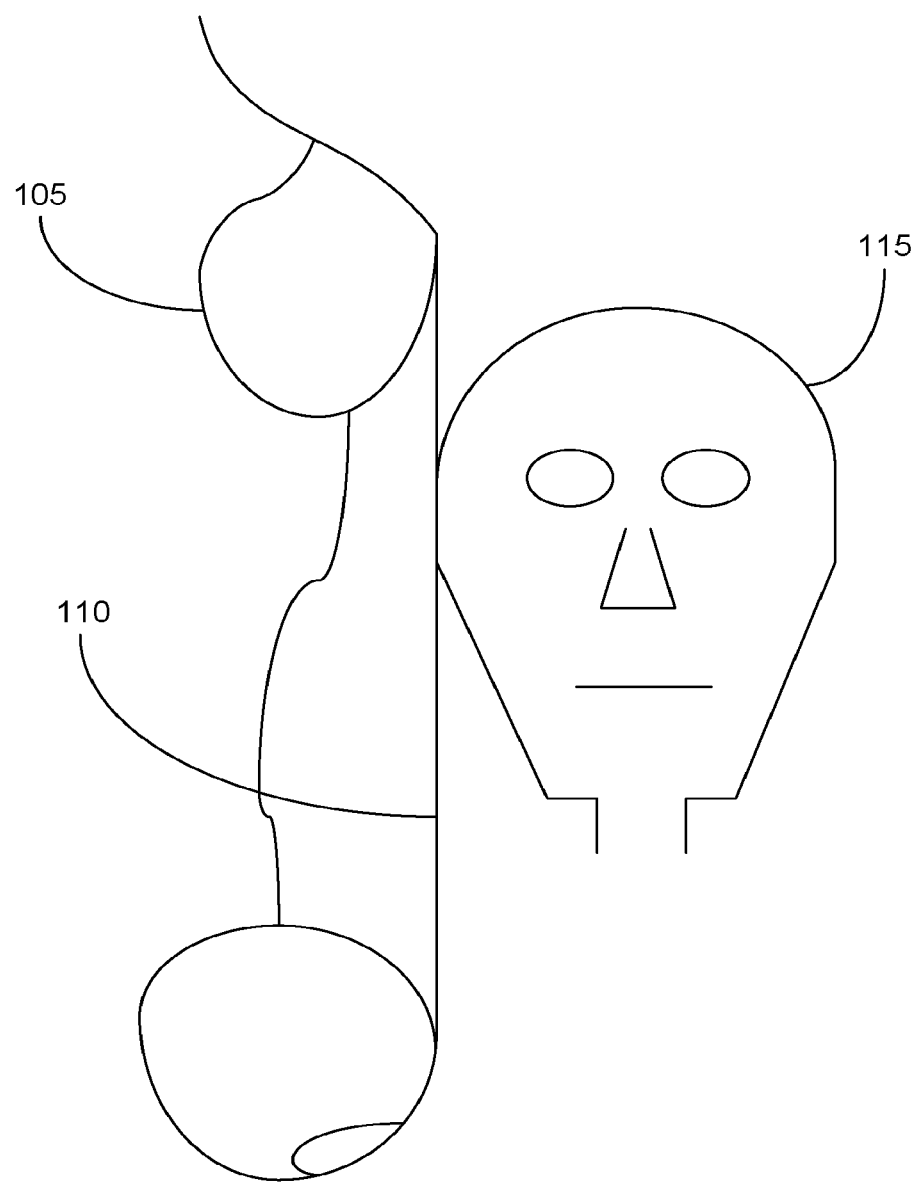
FIG. 3 is a side view of the curtain side airbag and button bridge in a deployed position according to one or more aspects of the disclosed subject matter.

FIG. 3 is a side view of the CSA 105 and the button bridge 110 in a deployed position according to one or more aspects of the disclosed subject matter. The CSA 105 can be deployed such that the inflation of the CSA 105 stretches the button bridge 110 to the predetermined tautness that corresponds to the fold length 210. As a result of the button bridge 110 deploying with the predetermined tautness, the head of occupant 115 can contact the button bridge 110. The button bridge 110 can allow the head to move forward along the button bridge 110 while in contact with the button bridge 110 while experiencing minimal head rotation from the one or more button features in the CSA 105.

Figure 4:
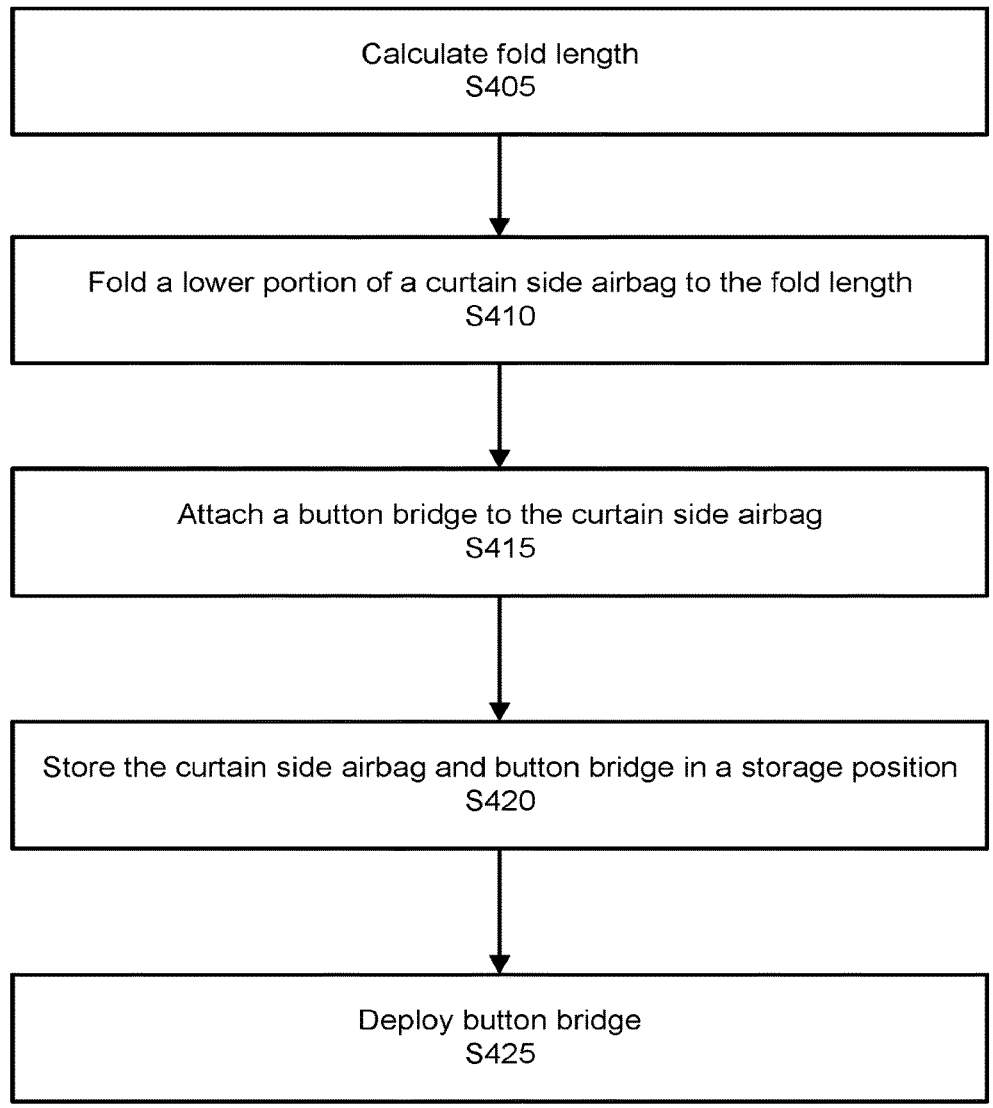
FIG. 4 is a workflow for the button bridge system according to one or more aspects of the disclosed subject matter.

FIG. 4 is a workflow for the button bridge system 100 according to one or more aspects of the disclosed subject matter.

In S405, the fold length 210 can be calculated via the remote device, for example. The calculation of the fold length 210 can include the year, make, and model of the vehicle 120 in which the button bridge 110 will be installed, the material of the button bridge 110, and additional tautness influencers (e.g., inflator pressure/size, inflation time, curtain chamber size). The calculation of the fold length 210 can result in the predetermined fold length 210 for each vehicle 120 in which the button bridge 110 will be installed.

In S410, the lower portion of the CSA 105 can be folded (in the fold direction 215), to the fold length 210 as calculated in S405.

In S415, the button bridge 110 can be attached to the CSA 105. The button bridge 110 can be attached (e.g., sewed) to an upper and lower portion of the CSA 105. Alternatively, the button bridge 110 can be attached to an upper and lower portion of the CSA 105, as well as forward and rearward portion of the CSA 105.

In S420, the lower portion of the CSA 105 and the corresponding portion of the button bridge 110 can be stored in a storage position. To be stored in the storage position, the lower portion of the CSA 105 and corresponding portion of the button bridge 110 can be rolled in a roll direction 220 until reaching the storage position.

In S425, the button bridge 110 can be deployed. For example, when the CSA 105 is deployed, the CSA 105 can be inflated with air. As a result of the CSA 105 being inflated, the CSA 105 can unfold/unroll which pulls the button bridge 110 taut (the tautness being determined by the calculation of the fold length 215), thereby providing a more uniform surface by creating a bridge over the button 225.

Next, a hardware description of the remote device according to exemplary embodiments is described. The remote device can perform various processing for the system 100, such as calculate the fold length 215, for example. The remote device can be a computer, a laptop, a tablet, a smart phone, a PDA, and the like. The remote device includes a CPU which performs the processes described above/below. The process data and instructions may be stored in memory. These processes and instructions may also be stored on a storage medium disk such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the remote device communicates, such as a server or computer.

Further, the claimed advancements may be provided as a utility application, background daemon, or component of an operating system, or combination thereof, executing in conjunction with the CPU and an operating system such as Microsoft Windows 7, UNIX, Solaris, LINUX, Apple MAC-OS and other systems known to those skilled in the art.

The hardware elements in order to achieve the remote device may be realized by various circuitry elements, known to those skilled in the art. For example, the CPU may be a Xenon or Core processor from Intel of America or an Opteron processor from AMD of America, or may be other processor types that would be recognized by one of ordinary skill in the art. Alternatively, the CPU may be implemented on an FPGA, ASIC, PLD or using discrete logic circuits, as one of ordinary skill in the art would recognize. Further, the CPU may be implemented as multiple processors cooperatively working in parallel to perform the instructions of the inventive processes described above.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

What is claimed is:

1. A button bridge system, comprising:
   a curtain side airbag; and
   a button bridge attached to the curtain side airbag, the attachment of the button bridge to the curtain side airbag including
   a first bridge sew attaching the button bridge to the curtain side airbag at a first predetermined portion of the curtain side airbag such that the curtain side airbag can be folded in a first direction such that the first bridge sew is a predetermined distance from a fold line,
   a second bridge sew attaching the button bridge to a second predetermined portion of the curtain side airbag, and
   a storage position such that the first bridge sew is rolled a predetermined amount in a second direction, the second direction being opposite the first direction.

2. The button bridge system according to claim 1, wherein the button bridge is attached to the curtain side airbag such that the button bridge is facing an occupant of a vehicle in which the curtain side airbag is installed.

3. The button bridge system according to claim 1, wherein the button bridge is configured to deploy to a predetermined tautness when the curtain side airbag is deployed, the predetermined tautness being based on the predetermined distance of the first bridge sew from the fold line.

4. The button bridge system according to claim 1, wherein the button bridge is configured to deploy with a uniform surface, the uniform surface configured to minimize rotation of the vehicle occupant's head.

5. The button bridge system according to claim 1, wherein the distance from the first bridge sew to the fold line is adjustable, each adjustment corresponding to a predetermined tautness of the button bridge when the curtain side airbag is deployed.

6. The button bridge system according to claim 1, wherein the first predetermined portion to which the first bridge sew is attached is a lower portion of the curtain side airbag.

7. The button bridge system according to claim 6, wherein the second bridge sew is attached to the curtain side airbag at an upper portion of the curtain side airbag, the upper portion of the curtain side airbag being opposite of the lower portion of the curtain side airbag.

8. The button bridge system according to claim 1, wherein the button bridge is attached to the curtain side airbag at a forward portion of the curtain side airbag and a rearward portion of the curtain side airbag.

9. The button bridge system according to claim 1, wherein the first direction corresponds to folding the first predetermined portion of the curtain side airbag toward the occupant of the vehicle in which the curtain side airbag is installed.

10. The button bridge system according to claim 1, wherein the second direction corresponds to rolling the first predetermined portion of the curtain side airbag away from the occupant of the vehicle in which the curtain side airbag is installed.

11. A method of deploying a button bridge, comprising:
    calculating a fold length, the fold length being a distance from a fold line to a point at which the button bridge is attached to a lower portion of a curtain side airbag;
    folding a lower portion of the curtain side airbag based on the fold length;
    attaching the button bridge to the curtain side airbag;
    storing the curtain side airbag and the button bridge in a storage position; and
    deploying the button bridge from the storage position.

12. The method of claim 11, wherein the button bridge is deployed to a predetermined tautness based on the fold length when the curtain side airbag is deployed.

13. The method of claim 11, wherein the calculation of the fold length includes values for the year, make, and model of a vehicle in which the button bridge is installed, a button bridge material, an inflator pressure/size of the curtain side airbag, an inflation time of the curtain side airbag, and curtain chamber size.

14. The method of claim 13, wherein the button bridge material is the same material as the curtain side airbag.

15. The method of claim 11, wherein the button bridge is attached to the lower portion and an upper portion of the curtain side airbag.

16. The method of claim 15, wherein the button bridge is attached to a forward portion and a rearward portion of the curtain side airbag.

17. The method of claim 11, wherein the fold length is adjustable, each adjustment corresponding to a predetermined tautness of the button bridge when the curtain side airbag is deployed.

18. The method of claim 11, wherein the button bridge is attached to the curtain side airbag such that the button bridge is facing an occupant of the vehicle in which the curtain side airbag is installed.

19. The method of claim 11, wherein the lower portion of curtain side airbag is folded in a first direction, the first direction being toward an occupant of the vehicle in which the curtain side airbag is installed.

20. The method of claim 11, wherein the lower portion of the curtain side airbag and corresponding portion of the button bridge reach the storage position in response to being rolled in a second direction, the second direction being away from the occupant of the vehicle in which the curtain side airbag is installed.

* * * * *